US010887673B2

(12) United States Patent
Sufuentes et al.

(10) Patent No.: US 10,887,673 B2
(45) Date of Patent: Jan. 5, 2021

(54) METHOD AND SYSTEM FOR ASSOCIATING RECORDED VIDEOS WITH HIGHLIGHT AND EVENT TAGS TO FACILITATE REPLAY SERVICES

(71) Applicants: Joaquin Sufuentes, Portland, OR (US); Franck Tankoua Kwimi, Strasbourg (FR)

(72) Inventors: Joaquin Sufuentes, Portland, OR (US); Franck Tankoua Kwimi, Strasbourg (FR)

(*) Notice: Subject to any disclaimer, the term of this patent is extended or adjusted under 35 U.S.C. 154(b) by 0 days.

(21) Appl. No.: 15/723,599

(22) Filed: Oct. 3, 2017

(65) Prior Publication Data
US 2018/0098134 A1 Apr. 5, 2018

Related U.S. Application Data

(60) Provisional application No. 62/404,156, filed on Oct. 4, 2016.

(30) Foreign Application Priority Data

Mar. 22, 2017 (EP) ..................................... 17162331

(51) Int. Cl.
*H04N 21/854* (2011.01)
*G11B 27/031* (2006.01)
(Continued)

(52) U.S. Cl.
CPC ......... *H04N 21/8549* (2013.01); *G06F 16/78* (2019.01); *G11B 27/031* (2013.01);
(Continued)

(58) Field of Classification Search
CPC ............. G11B 27/031; H04N 21/8547; H04N 21/8549; H04N 21/47217; H04N 21/475;
(Continued)

(56) References Cited

U.S. PATENT DOCUMENTS

2009/0009605 A1\* 1/2009 Ortiz ...................... H04N 5/232
348/157
2009/0132924 A1 5/2009 Vasa et al.
(Continued)

FOREIGN PATENT DOCUMENTS

EP 2245825 11/2010

OTHER PUBLICATIONS

David Mills, "Computer Network Time Synchronization: The Network Time Protocol", Chapter 1, Basic Concepts, CRC Press, 2011 (18 pages).

*Primary Examiner* — Thai Q Tran
*Assistant Examiner* — Syed Y Hasan
(74) *Attorney, Agent, or Firm* — JMB Davis Ben-David (57) ABSTRACT

The invention relates to a method for remote and real-time selecting a section in a video file with a mobile device, wherein a spectator attending an event selects a section of a video file by sending a highlight-marker from his mobile device to a server system, wherein the selection can be performed without the user having access to the camera recording the event. Highlight-marker and video file are systematically time synchronized. Furthermore, the invention relates to a method for generating a highlight-video from a plurality of highlight sections.

15 Claims, 3 Drawing Sheets

(51) Int. Cl.
*H04N 5/91* (2006.01)
*G11B 27/10* (2006.01)
*G06F 16/78* (2019.01)
*H04N 21/8549* (2011.01)
*H04N 21/8547* (2011.01)

(52) U.S. Cl.
CPC ............... *G11B 27/10* (2013.01); *H04N 5/91* (2013.01); *H04N 21/8547* (2013.01)

(58) Field of Classification Search
CPC ........... H04N 21/233; H04N 21/23418; H04N 21/84; G06F 17/30289; G06F 17/30569; G06K 9/00751; A63B 2220/806
USPC ........... 386/278, 241; 707/756, 805; 725/13; 348/157
See application file for complete search history.

(56) References Cited

U.S. PATENT DOCUMENTS

| | | | |
|---|---|---|---|
| 2010/0042642 A1* | 2/2010 | Shahraray | G06F 17/30884 707/756 |
| 2013/0239132 A1* | 9/2013 | Rakoff | H04N 21/23439 725/13 |
| 2016/0261929 A1* | 9/2016 | Lee | G06K 9/00724 |

* cited by examiner

203m: 01:30:30pm; mobile device time    => 204m:
01:30:24pm; server system time    =>
205m: 6s; mobile device offset time 203c: 02:16:20pm; camera time    =>
204c: 01:15:13pm: server system time =>
205c: 1h:1min:7s: camera offset time

METHOD AND SYSTEM FOR ASSOCIATING RECORDED VIDEOS WITH HIGHLIGHT AND EVENT TAGS TO FACILITATE REPLAY SERVICES

CROSS REFERENCE TO RELATED APPLICATIONS

Benefit is claimed to European Patent Application No. 17162331.7, filed Mar. 22, 2017, and U.S. Provisional Patent Application No. 62/404,156, filed Oct. 4, 2016, The contents of the foregoing patent applications are incorporated by reference herein in their entirety.

FIELD

The invention relates to a method for remote tagging of a video file with a mobile device and a method for generating a highlight-video from a plurality of highlight sections.

BACKGROUND

Parents and interested spectators attend live events, such as: sporting, theatrical, ceremonies and other types of gatherings wherein someone is recording the event. Those people attending are often interested in specific portions of the event wherein a good play, in the case of a sporting event, may occur; or a speech given or announcement made in the case of a ceremony; or a song sung in the case of a theatrical. These events which are recorded lend themselves to be replayed for the interested audience either during the event or at a later time. The same recorded portions of the event lend themselves to be shared and reviewed by the attending spectator with a broader audience, such as family members, friends, a group of aficionados, the participant of the event for analysing his play or the like etc.

Currently, the ability to replay an event is mainly limited to getting a physical copy of the entire event video, or accessing the same online via internet. Likewise, it is not possible to tag an event, while watching the event simultaneously, i.e. while the event is taking place and the video is captured particularly by a non-connected device. Therefore, it is cumbersome to attempt to visually scan a long recorded event and try to identify the specific portions one witnessed and is interested in replaying, recording, storing and/or sharing with others. These leaves many people with videos, link to videos, disks, tapes, etc. that they may never go back and see. However, if they could go direct to the parts of the event most of interest to them, and in some fashion compile them or share them in short form with others, spectators would derive more value from their video archives.

As a result, many moments in life are just memories and even though many people recorded these events, those events are difficult to recover; subsequently, they end up lost or unable to be replayed and enjoyed by family members and future generations.

SUMMARY

An object of the present invention is to provide a method for remote, real-time and comfortable tagging of video files, particularly of an event that a user of a mobile phone attends and a third person is recording with a camera. The object is achieved by the method having the features of claim 1.

Advantageous embodiments are described in the sub-claims.

BRIEF DESCRIPTION OF THE DRAWINGS

Further features and advantages of the invention shall be described by means of a detailed description of embodiments with reference to the Figures. The features of these embodiments can be combined and mixed in any meaningful manner, wherein it is shown in FIG. 1 a system according to the invention.

DETAILED DESCRIPTION

According to claim 1, the method for remote tagging of a section in a video file with a mobile device comprises the steps of:

Recording a video file encoding a video with a camera, such as a video-camera, a CCD-camera, a time-of-flight camera, a stereo camera, or a camera comprised in a mobile device.

The video might be encoded in an uncompressed, particularly lossless, or in a compressed data format.

Storing the video file associated with a video file time reference from a time reference system of the camera, and an event identifier associated with the video file particularly on a server system or on a data-storage.

A time reference can, for example, be stored in the metadata of the video file, and can comprise, for example, the time and date of the video file, wherein, for example, the start and/or end time of recording is stored. The time and date of the time reference is acquired by the time reference system of the camera. The time reference system can be given by an internal clock of the camera or some time signal that is received by the camera from external sources.

The time reference of the video file allows identification of specific sections in the video. Additionally, it is important to note that the time reference may be in the camera having the correct regional time for the recording, or it may be derived from an external source when recording begins on the camera.

The event identifier is particularly a tag configured for identifying or finding a specific event that has been recorded by the camera. The event identifier particularly refers to the content of the video. The event identifier is associated with the video file, thus by looking up the event identifier, the video file can be retrieved. The event identifier can also be stored in the metadata of the video file. The event identifier may also contain a unique and repeatable character or set of characters such as ">" or "#hilight#, etc., which allows the same event recorded from different cameras to be highlighted after posting to any searchable web site.

The server system can, for example, comprise a locally arranged server comprised by or arranged at the camera, wherein the local server is connected to a web server (providing cloud services).

The server system can further comprise a data-storage on which the video file is recorded and stored. Furthermore, the server system is particularly connected to the camera, particularly by a wire connection, such Local Area Network (LAN) or Wide Area Network (WAN), but also wirelessly for example by a Wireless Local Area Network (such as Wi-Fi) or a Wireless Wide Area Network (such a 4G cellular).

However, it is possible that the server system comprises only a single server device that is particularly arranged in the vicinity of the camera or is a cloud server to which the video file is uploaded simultaneously or after recording.

Receiving a user input on a mobile device, particularly while the video file is recorded, wherein upon user input an electronic highlight-marker is generated on the mobile device, wherein the highlight-marker comprises a time reference from a time reference system of the mobile device and particularly calibrated to a time reference system on a server device, a highlight time defining a time segment that relates to the time reference system of the mobile device. Furthermore, the highlight-marker comprises an event identifier.

The user input can have the form of an interaction with a touchscreen, keys or buttons of the mobile device, or a voice controlled input, particularly received by the microphone of the mobile device. Other interactions are possible for the user input, such as shaking of the mobile device.

The electronic highlight-marker comprises a time reference as well. The time reference associated with the highlight-marker is stemming from the time reference system of the mobile device. Analogous to the camera, the time reference system of the mobile device can be given by an internal clock or some time signal that is received by the mobile device from external sources.

Thus, a time information is associated with the highlight-marker, wherein the time information refers to the time reference system of the mobile device. The time reference can, for example, comprise the information when the input has been received by the mobile device. The highlight-marker can further comprise a user ID and/or a mobile device ID that can be used for identifying saved highlight-markers in a cloud service that stores highlight-markers from a plurality of users.

The highlight-marker, furthermore, comprises a highlight time. This highlight time is for defining a time segment that comprises a time point, around which the user wants to select a portion of the video.

The highlight time can refer to a time point that lies in the past with respect to the user input, and particularly to the highlight-marker generation. The highlight time does not necessary only refer to a single time point, but can also comprise a time interval, a start and/or end time, or the like. The highlight time, therefore, is configured to select a specific time point and/or duration.

Sending from the mobile device the electronic highlight-marker particularly by means of radio transmission, particularly by a transmission unit comprised by the mobile device, to the server system. Transmission can be achieved particularly via a cellular network, a wireless network such as radio, Bluetooth or Wi-Fi, as well via the internet.

Sending the video file to the server system.

Receiving the highlight-marker by the server system. The server system, therefore, comprises or is connected to a receiving means that is configured to receive said highlight-marker and transmit the highlight-marker either by radio or wire transmission to the server system.

Synchronizing the time references of the video file and the received highlight-marker, including the time reference for the highlight time, to a common time reference system. Said common reference system is, for example, the time reference system of the server system. But other time reference systems can be used as well. It is also possible that the common time reference system is the reference system of the camera or the mobile device.

For example, if the server system is a local server arranged at the camera, its time reference system is synchronized to the regional time by interacting with a cloud service to assure its time is accurate, additionally the client app of the spectators would also be connected to the cloud service, or the local server to maintain a synchronized clock. Thus, the common time reference system would be the time reference system of the cloud service.

The synchronization step is important, as the time references of the highlight-marker, and thus the highlight time and the video file might be shifted with respect to each other. Such a shift can, for example, occur due to device clocks having their own time update mechanisms, causing the date and/or time of the video file time reference being shifted with respect to the date and/or time of the highlight-marker time reference.

In order to be able to tag the correct moment or the correct moments on the video file with the highlight-marker, it is important to synchronize the time references of the video file and the highlight-marker (and importantly also the highlight time), such that simultaneous time points have the same time reference in the video file and the highlight-marker.

Particularly associating the time-synchronized highlight-marker to the time-synchronized video file. This can be done for example by comparing the event identifiers of the highlight-marker and the video file. Highlight-markers and video files with the same event identifier can be associated in a group of time-synchronized makers and video files.

Selecting a highlight section of the time-synchronized video file, wherein the highlight section of the time-synchronized video file comprises the part of the video that has been recorded simultaneously with the time-synchronized highlight time. Due to the synchronized highlight-marker and video file, it is possible to select a highlight section of the video file, even though the mobile device and the camera are not necessary connected directly with each other.

Playing back a highlight-video, wherein the highlight-video comprises the highlight section of the time-synchronized video file.

The method according to the invention allows the user of a mobile device to tag specific moments, particularly in real-time, for example during a soccer game, even though the user does not have any specifics about the recording camera or an application on the device.

Furthermore, the user does not necessarily need access to a video stream or any feedback mechanism of the recording camera at all. The user solely selects specific moments that are then selected in a recorded video.

For example, during a soccer game, many cameras record the events on the field. According to the invention, it is possible that a spectator (e.g. a user of a mobile device) in the stadium watching said game can select specific moments at will on his mobile device for example by pushing a specific (graphical or real) button on the mobile device. By pushing said button a specific portion of the recorded camera footage that was recorded at that time (or some time earlier) is selected, even though, the spectator has no idea on the specific video that has been recorded by said cameras, and no physical, virtual or application connection to said cameras.

Thus, it becomes possible to attend a live event in person without being distracted by recording the event personally, while nonetheless keeping the possibility to save certain highlights for later review.

The steps of the method according to the invention do not have to be executed in a fixed order. For example, the sending of the video file to the server can happen at some time after the event.

Similarly, the video file and the video can be stored on the server or on a local server device or on a local data-storage.

According to an embodiment of the invention, the video file and the highlight time are synchronized in time by the steps of:

- determining a camera offset time between the time reference system of the camera and a server system time of the server system, for example by clicking a 'synch'-button on an associated mobile device of the person operating the camera or the camera itself before the recording of the video file is started, that causes the mobile device or the camera to send a data package containing a start time of the video file. Upon receipt of said data package said start time is used to estimate a server system time point corresponding to the time when the recording of the video file has started. By comparison of the start time comprised in the data package and the server system time point, the camera-offset time can be determined.
- Determining a mobile device offset time between the time reference system of the mobile device and the server system time of the server system, e.g. by clicking a 'synch' button on the mobile device or automatically by a computer program being executed on the mobile device. Analogous to the offset time determination of the camera, the offset time of the mobile device can be estimated also by means of a data package comprising a specific time point based in the mobile device time reference system.
- Offsetting the video file time reference by the camera offset time and the time reference of the highlight-marker by the mobile device offset time such that the time reference of the video file and time reference of the highlight-marker, including the time reference of the highlight time, are time-synchronized, particularly to the time reference system of the server system, i.e. simultaneous events have the same time code in both the video file and the highlight time.

The synchronization can be done on the server system, but also on the mobile device.

In the latter case, the data packages comprising the specific time points can be sent correspondingly by the camera and the server system.

The advantage of synchronizing the time reference of the camera and the time reference of the mobile device to the time reference of the server system is that all video files, particularly video files recorded for different events (i.e. with a different event identifier), with different cameras, and all highlight-markers stemming potentially from a plurality of different mobile devices, at different events, particularly being sent via different networks, will be referenced to a single, common time reference system, such that highlight-markers can be interchanged between video files, without the need to be re-synchronized to a different time reference.

This is, for example, advantageous, if by mistake the event identifier refers to the wrong event, or if multiple event identifiers are merged together for a single event. With the above outlined embodiment, only the reassignment of the event identifier is necessary, but no new synchronization is required.

The method according to the invention is advantageously saving the time one has to spend when doing video editing for re-identifying the highlight of a video or an event.

According to another embodiment of the invention, the highlight time comprises a start time, an end time and/or a centre time, wherein the highlight section of the video file comprises the part of the video that has been recorded between the time-synchronized start time and the time-synchronized end time, or between the time-synchronized start time and a predefined highlight duration length after the time-synchronized start time or between the time-synchronized end time and a predefined highlight duration length before the time-synchronized end time, or around a predefined highlight duration length centred around the centre time, respectively, wherein the highlight duration length is particularly 10 seconds, 30 seconds, one minute, or three minutes.

Also, user-defined highlight duration lengths can be individually predefined.

In this embodiment, the highlight-marker and thus the highlight time, essentially comprises at least two pieces of timing information. The two pieces of timing information can be generated for example by two clicks of the user on a virtual button displayed on the screen of the mobile device. The two pieces of timing information can be for example a start time and an end time, or to a start time and a highlight duration length, wherein the highlight duration is defined by the time interval between the two clicks.

Alternatively, also a 'button down' and a 'button up' event can serve as the two pieces timing information. For example, the predefined highlight duration is defined by the duration of the user pushing the button (button down) until the user releasing the button (button up). The start time can be associated with the 'button down' event.

Independent of the exact timing of the user input, the start time and/or end time of the highlight-marker can be shifted by a predefined amount of time, particularly towards the past. This shift of the start time and/or end time towards the past is particularly realized by the following embodiment.

Alternatively, it is possible to use only one 'click', defining, for example, the start time, a centre time or an end time of the highlight and a predefined highlight duration length for defining a highlight section.

According to another embodiment of the invention, the highlight time, particularly the start time, comprises or corresponds to a time point that lies in the past by a predefined, particularly user-adjustable time, particularly 10 seconds, 30 seconds, one minute, or three minutes, with respect to the time of the user input on the mobile device.

This embodiment is particularly advantageous, as highlights, particularly in sport events, often happen more or less unforeseeable.

For this reason, it is particularly useful if the user has the option to shift the highlight time, particularly the start or centre time towards the past with respect to the user input time.

For example, when the user pushes a highlight-marker button on his mobile device, the assigned highlight time is particularly automatically shifted by a predefined amount of time earlier to the user input, for example by 30 seconds.

Alternatively, the user has the option, for example on a scroll button or another suitable interface of his mobile device, to define the amount of time the highlight time is to be shifted in time with respect to his input.

Thus, the user input and the highlight time do not need to refer to identical time points.

Apart from all embodiments, the user input is not limited to tactile actions of the user with the mobile device, but can for example also be based on sound, for example, voice control.

The highlight-marker can comprise also additional annotations that are made by the user.

According to another embodiment of the invention, a person recording the video file sends a video start-time marker, particularly with a mobile device or the camera, when the person starts to record the video file, such that the video file time reference can be synchronized to the common time reference by means of the video start-time marker, particularly by associating the start time of the video [that can be determined from the video file time reference] to the video start-time marker, wherein said video start-time marker is synchronized to the common time reference system.

This embodiment is particularly advantageous, as it allows the use of any camera, without the need of having special equipment in order to perform the method according to the invention.

According to another embodiment of the invention, the server system comprises a web server, particularly comprising an application server, and wherein at least one step of the method is carried out on the web server, wherein the web server is particularly connected to a local server arranged in the proximity of the camera, for example by a computer network or by cellular network.

According to another embodiment of the invention, a plurality of highlight-markers, particularly sent from a plurality of mobile devices, are time-synchronized and associated to the time-synchronized video file, wherein the plurality of highlight-markers mark a plurality of highlight sections.

This embodiment explicitly allows for the selection for multiple highlight sections in a video file.

The highlight-markers can stem from the same mobile device or from different mobile devices.

By means of a user ID or mobile device ID that can be associated to each highlight-marker, it is later possible to assign or play back the highlight sections to the corresponding user.

It is, however, also possible, particularly with the user's consent, to generate a highlight-video that comprises highlight sections corresponding to highlight-markers associated to different user IDs or mobile device IDs.

According to another embodiment of the invention, a title image for displaying with the highlight section(s) is selected, wherein the title image is selected from a section defined by a plurality of (in time) overlapping highlight sections, wherein the title image corresponds to a frame of the video file that is comprised in said overlap section, wherein said frame corresponds particularly to the frame in the middle of the overlap section, wherein the title image is particularly displayed to the user.

Additionally, said overlapping plurality of highlight sections is defined by the most marked highlights. For example, by taking an average of the user defined highlight times, for example the start times or centre times, the method according to the invention selects the most marked highlights, takes the average highlight time, e.g. the start time or centre time, and selects the frame of the video at half that time as the title image for the highlight video, thus providing a better systematic way to get photo-teasers for each highlight.

According to another embodiment of the invention, a poll of marked highlights is performed to identify a plurality of popular highlights. Said popular highlights are for example selected by means of the highest frequency of highlight-markers for a similar time segment. This allows other spectators or coaches to benefit from the "knowledge" of the crowd.

This embodiment opens up the possibility of ancillary services which rank highlights across teams, clubs, etc. and the best of the best can be shown programmatically by the highlight service.

According to another embodiment of the invention, the video file and the highlight-marker, or the plurality of highlight-markers, is uploaded to a web server comprised in the server system, wherein the web server is configured for saving the video file and the highlight-marker(s), wherein the web server can be configured for providing software apps to computers or the mobile device linked to the network, for video editing, or other cloud services etc.

In this embodiment, a local server is particularly arranged at or in the proximity of the event, wherein the camera(s) recording the event are connected to said local server. The local server, furthermore, can be configured to maintain a network connection to the mobile device or the plurality of mobile devices.

Also, it is possible that the method according to the invention is executed at least partially on a mobile device, wherein said app is particularly configured to perform the steps necessary to mark a highlight according to the invention.

Advantageously, the local server is configured to provide sufficient bandwidth for live-streaming of the recorded video of the camera(s) to a plurality of mobile devices. The local server, furthermore, is then configured to send data to the web server. On the web server, all recorded content and highlight-markers can be further edited, distributed or stored for longer periods of time.

Alternatively, the server system consists of the web server. A web server can provide for example cloud services connecting via a computer network such as the internet or a cellular network.

According to another embodiment of the invention, the highlight-video is played back on a computer or the mobile device, wherein when the highlight-video is played back, the server system sends or streams, particularly via a computer network or the cellular network, only that part of the video file that corresponds to the highlight section of the video to the computer or the mobile device instead of information comprising other parts of the video file.

According to another embodiment of the invention, the computer or the mobile device pre-fetch and fetch only the section or the sections of the video file from the server system that correspond to the highlight section or to the highlight sections.

This and the previous embodiment are particularly bandwidth efficient. Common video player software fetches a video by streaming the whole of the video file to the client device, in this case, for example the mobile device or computer.

According to the invention, the video playback application particularly proxies the users desire to see only the highlights, and virtually jumps ahead in the video file to the highlighted sections, actively monitors the video stream to capture all packets for the highlight section, then jumps to the next highlight section and downloads said next highlight section. This process can repeat itself until all the highlight sections are loaded to the client and ready for viewing. This approach leaves behind parts of the video file that are not comprising the highlight section, and would otherwise waste bandwidth.

According to another embodiment of the invention, a download-, streaming- or sharing-link of the highlight-video is generated and provided to the user of the mobile device or selected recipients.

This embodiment allows for the comfortable dissemination of selected highlights.

According to another embodiment of the invention, a highlight-video file comprising the highlight section of the video file is generated and stored on the server system, particularly the web server, particularly, wherein a download-, streaming- or sharing-link of the highlight-video is generated and provided to the user of the mobile device or selected recipients.

By generating the highlight-video file, at least a portion of the recorded video of the video file is duplicated. The smaller highlight-video file can be shared without streaming, but for example by provision of a download link and stored on local databases, so that it is accessible even when no network connection of the computer is available to the computer that stores the highlight-video file.

Nonetheless, also the highlight-video file can be streamed.

Streaming in contrast to downloading usually does not involve the generation of a full copy of the streamed content on the device receiving the stream.

The term "streaming", therefore, refers to a data transfer between remote computers or servers, wherein a data stream receiving computer keeps only transitory copies of the data comprised in the stream.

The term "remote" refers to devices that are comprised in separate housings, wherein "remote" particularly refers to a network system, where a server is connected to a computer or a mobile device, wherein the computer or mobile device is considered to be remotely located with respect to the server.

According to another embodiment of the invention, the server system, particularly a local server, streams a bit size-reduced video stream, particularly comprising a file structure that is optimized for streaming, with an associated time reference of the video file to the mobile device, particularly while the video file is being recorded by the camera, wherein the bit size-reduced video stream is played back on the mobile device, and wherein a highlight-video file is generated particularly on and by the mobile device from the bit-size reduced video stream and the highlight-marker, particularly wherein the highlight-marker and the bit-size reduced video stream are time-synchronized based on the time reference of the video file or the time reference system of the server system.

This embodiment allows for the marking of the highlight on the mobile device, particularly while the bit-size reduced video stream is played back on the mobile device. Thus, the user can see while selecting the highlight, which section of the video he marks as the highlight section.

As the bit-size reduced video stream is marked by the highlight-marker, the synchronization step is of secondary nature, as the user has an instant feedback on the section he is marking. Thus, the time references of the video stream and the highlight-marker are already in synch. Nonetheless, it might be advantageous to synchronize the time references of the highlight-marker and the bit-size reduced video file to the reference system of the server system in order to keep a common time reference for all video files and highlight-markers.

According to another embodiment of the invention, the highlight section or the highlight sections are played back in real-time or close to real-time, or a link is provided linking to the highlight section or the highlight sections.

The video comprising only the highlight sections or the highlight sections (and not the not highlighted sections) is referred to as the stitched video.

According to another embodiment of the invention, a plurality of cameras record a plurality of video files, wherein the event identifier is the same for the video files, and particularly an extended highlight section is selected, wherein said extended highlight section comprises at least one highlight section of the time-synchronized video files comprising the part of the recorded videos that have been recorded simultaneously with the time-synchronized highlight time.

This embodiment allows for the contribution and accessibility of a plurality of video files for tagging a highlight. As the plurality of video files is associated with the same event identifier, the same instance can be recorded several times by different cameras. A highlight-marker with a highlight time, therefore, can be used to select a plurality of highlight sections in the plurality of video files. The plurality of highlight sections can then be combined to an extended highlight section.

The user can later decide which highlight section of the extended highlight section he wants to store and which to discard.

According to another embodiment of the invention, the server system sends an event indicator to mobile devices that are within a predefined vicinity of the camera, wherein the event indicator comprises the event identifier, wherein the mobile devices are particularly registered by a common register, wherein said register is particularly a software register associated with a computer program executed on the mobile device.

The event indicator can be the event identifier.

The predefined vicinity can, for example, be the stadium, the hall, or the field, where the event happens. Thus, it is possible to provide access to a selected group of mobile devices. This can be advantageous in certain circumstances where copyright and distribution restrictions apply to people attending the event.

The predefined vicinity extends particularly less than 500 m, more particularly less than 1000 m, more particularly less than 5 km around the location of the camera.

Thus, the server system will particularly only accept highlight-markers from mobile devices within the predefined vicinity.

It is also possible that highlight sections are only played back while the user is within the predefined vicinity or while the event is still ongoing.

According to another embodiment of the invention, the highlight section of the time-synchronized video file is adjusted particularly by user input on the mobile device, in duration and/or position on the video file or the video files.

This embodiment refers to an adjustment option, in case the highlight time needs some editing. Generally, also other information associated to the highlight-marker can be edited at a later time point, for example, comments or highlight-marker IDs can be edited.

According to another embodiment of the invention, the event identifier of the video file and/or the highlight-marker is changed to a new event identifier particularly after the video file has been recorded.

As explained above, it is particularly not necessary to synchronize the reassigned highlight-marker to the video file, as particularly all video files and highlight-markers are time synchronized to a common time reference, particularly the time reference of the server system.

According to another embodiment of the invention, a time difference between the time reference of the video file and the common time reference system is stored on the server system, wherein the stored time difference is assigned to the camera that recorded the video file particularly as per the event and video file metadata, and wherein the stored time difference is used for synchronizing the time reference of the video file and the highlight time of the highlight-marker to the common time reference system of a subsequently recorded video file by the camera, particularly without necessitating manual calibration and allowing the camera to be linked across videographers for example by event metadata, such as location, club, team, organization, etc. As one aspect of the method is that any video camera can be used to mesh with the user identified highlights. This is particularly accomplished by calibrating or referencing the start of recording of the video to a network/server time (or more general to the common time reference system); According to one embodiment the videographer for example hits a start recording button on the app at the time the videographer starts the video recording. In case the videographer forgets to do this at another event or a subsequent video file, the method according to the invention can make use of the camera to network time difference that is stored from prior events or video files in which the camera was used. This way, the method becomes more automated maintaining a camera/user to network time calibration table to aid the users and avoid synchronization problems.

For example, the camera that is used for recording the video file will have a certain time reference system that for example was programed into it or came out of the box. This time reference system however, is very unlikely to coincide to the time reference system of the mobile device (down to the second) the user uses for generating and sending the electronic highlight-marker. Therefore, according to the invention, the recording camera time reference system is synchronized to a common time reference system the video start-time marker, that is for example generated with the mobile device, when the person starts to record the video file, e.g. by clicking a button on the mobile device. However, it is recognized that sometimes the user might forget to generate the start-time marker or the user generates the start-time marker several seconds after the recording with the camera started, thereby potentially throwing off the synchronization of the highlights. The above mentioned embodiment solves this problem by storing at least one successful start-time marker (i.e. generated at the right time, when the video recording starts) and thus a successful video file time reference system to common time reference system synchronization particularly under a catalogue or in a directory that matches for example the videographer, i.e. the user and/or the reference time system of the camera to the common time reference system and/or the time reference system of the mobile device. With this information stored, the method is able to perform the synchronization, even if the start-time marker might be wrong, by using a previously stored start-time marker or the stored time difference.

The problem according to the invention is also solved by a computer program, wherein the computer program comprises computer program code, that, when executed on a computer or on a mobile device, performs the method according to the invention.

Of course, the user input and decision making, such as when to start the video recording or when to provide the user input to the mobile device remain unaffected by the computer program.

The computer program aims to implement the method according to the invention particularly on the mobile device.

Also, the computer program can be executed in parts on the server system and even on the camera.

The problem is also solved by a method for generating a highlight-video from a plurality of highlight sections, comprising the steps of:
  providing a video file, particularly on a server system,
  providing a plurality of highlight-markers, particularly on a server system, wherein each highlight-marker comprises a highlight time, defining a time segment in the video file,
  wherein the video file and the plurality of highlight-markers are stored on a server system,
  playing back only the part of the video file that is comprised by the time segments of the highlight times of the highlight-markers, wherein said part of the video file is particularly played back on a remote computer.
  wherein particularly only said part of the video is streamed or downloaded to the remote computer.

It is noted that the highlight-markers according to this solution do not have to be submitted by the method as laid out above. However, this possibility is also not excluded.

The terms of this method correspond to the terms as laid out for the method disclosed above.

The video that is created by arranging all highlights in a row, without the segments that are not highlighted, can be referred to the stitched video.

In an embodiment of the invention, a link can be provided that refers to the stitched video.

The problem according to the invention is also solved by a system for remote tagging of a video file, comprising at least the following components:
  a data-storage,
  at least one camera, such as for example described above for recording a video file, wherein the at least one camera is configured to save video data comprising the video file, an event identifier and a time reference of the video file from a time reference system of the camera on the electronic data-storage,
  at least one mobile device, such as for example a mobile phone, a smartphone and/or a tablet particularly comprising a means for radio wave transmission, wherein the mobile device is configured to send a highlight-marker, comprising a time reference of the highlight-marker from a time reference system of the mobile device and a highlight time based on the time reference of the highlight-marker,
  a server system, for example a local server system and/or a web server, such as a cloud service, connected to the data-storage, wherein the server system is configured to receive the highlight-marker from the mobile device, wherein the server system has a time reference system, for synchronizing the time reference of the video file and a time reference of the highlight-marker with the time reference system of the server system.

In the following, some definitions of terms and phrases used herein are given.

A mobile device is particularly a device that is capable of performing the required actions according to the invention and to provide the required signals to perform the method according to the invention, wherein the mobile device is particularly not immobile.

A mobile device is particularly a small computer, particularly small enough to hold and operate in the hand and particularly having an operating system capable of running mobile apps—software programs and applications designed to run on mobile devices.

A mobile device, therefore, is particularly a computerized device that is portable and weights particularly less than 500 g.

A mobile device can, for example, be a mobile phone, a smart phone or a tablet computer, and comprises at least one processor, the so-called CPU (central processing unit).

However, a mobile device can also be a remote control for e.g. a television.

Furthermore, a mobile device particularly comprises means for cellular network and/or internet connectivity. The cellular network capability is for connecting to a mobile network, such as for example GSM (Global System for Mobile Communications), 3G, 4G or 5G, CDMA (Code Division Multiple Access), CDMA2000, UTMS (Universal Mobile Telecommunications System), or LTE (Long Term Evolution).

The mobile device particularly comprises a display screen with a small numeric or alphanumeric keyboard and/or a touchscreen configured to provide a virtual keyboard and buttons (icons) on-screen. The mobile device is particularly configured to connect to the Internet and interconnect with other computerized devices via Wi-Fi, Bluetooth or near field communication (NFC).the mobile device particularly comprises integrated cameras, digital media players, a mobile phone, and GPS capabilities.

The mobile device is particularly configured to provide a time reference for apps and data, wherein said time reference is provided by a time reference system such as an internal clock or a timer of the mobile device or by external signals that are for example received by the internet, the mobile network, or GPS. The time reference can be adjusted for different time zones.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data-storage apparatus and/or other apparatus such as input and output ports. The terms 'processor' or 'computer' denote also a plurality of processors or computers connected, and/or linked and/or otherwise communicating, possibly sharing one or more other resources such as a memory.

As used herein, the terms 'server', 'server system' or 'backend' denotes a computerized device providing data and/or operational service or services to one or more other computerized devices or computers.

The term 'computerized device' or 'computerized system or a similar term denotes an apparatus or an interconnected system if apparatuses comprising one or more processors operable or operating according to one or more programs.

A device storing and/or comprising a program and/or data constitutes an article of manufacture. Unless otherwise specified, the program and/or data are stored in or on a non-transitory medium.

A camera in the meaning of the current specification is or comprises particularly a video recording device or a video recording system.

Figure 1:
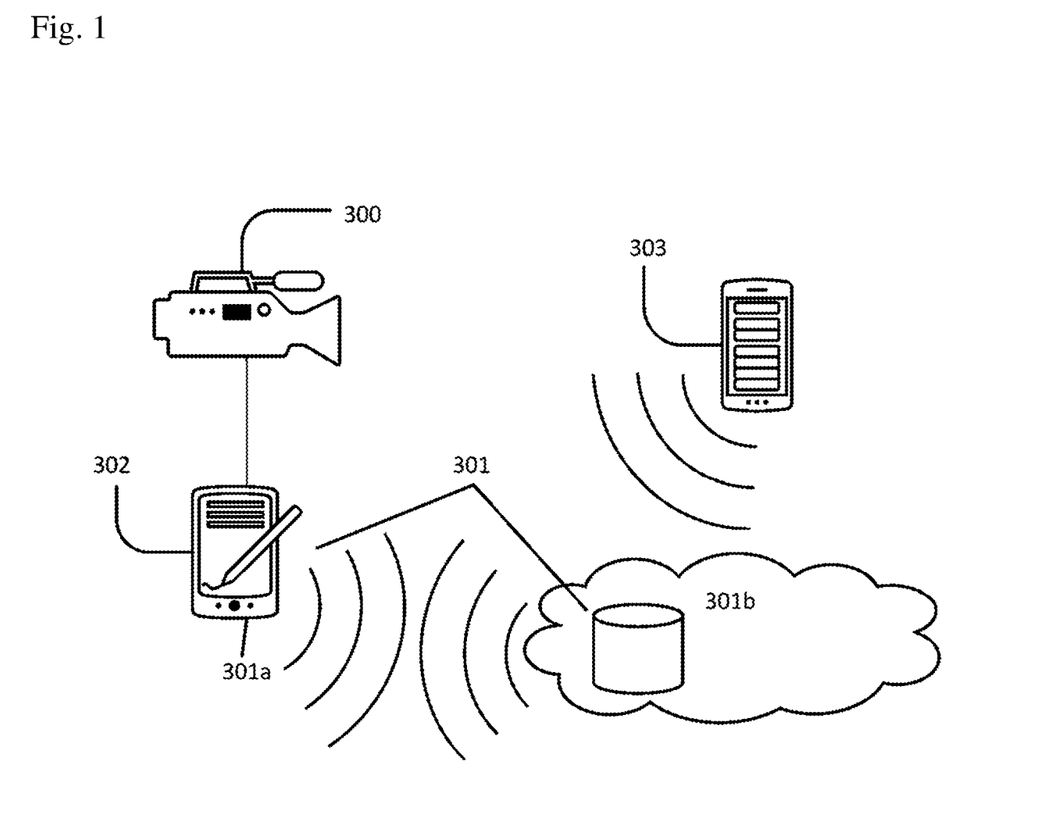

In FIG. 1 a system is shown that is capable of executing the method according to the invention. The system comprises a camera 300 that is arranged at the location of the event. The camera 300 is connected to a server system 301, comprising a local server unit 301a comprising a data-storage 302. The server system 301 further comprises a web server 301b, wherein the web server 301b is connected to the local server 301a. The local server 301a is connected to the web server 301b via a computer network, in this example, via the internet. The server system 301 has a time reference system that is based the Coordinated Universal Time (UTC).

The camera 300 is connected to the local server 301a and is configured to transmit the recorded video file to the local server 301a. The video file is stored in the data-storage 302 of the local server 301a. But it can also be uploaded to the web server 301b.

The camera 300 has a time reference system that associates each video file with a time reference of the camera 300 and an event identifier.

The operator of the camera sends a synchronization signal, i.e. a video start time marker from a mobile device running an app configured for executing the method according to the invention, wherein the camera operator sends said synchronization signal when he starts with the recording of the video file.

Said synchronization signal received by the server system can then be used to later associate for example the beginning of the video with a specific server time or a time of another common time reference system. For example, the time of receipt of the synchronization signal can be used for indicating the video start time. This is particularly advantageous, as often times the video file is uploaded to the server system only after the recording is finished.

Alternatively the camera itself is configured to send such a synchronization signal to the server system.

A spectator with a mobile device 303 that is configured for the method according to the invention, for example by having a specific app executed, can connect to the server system 301. The connection is particularly enabled, when the user of the mobile device 303 is in the vicinity of the event, e.g. when he attends the event.

The mobile device 303 comprises a computer program (app) that, when executed, is configured to generate 103 a highlight-marker upon user input. The computer program is further configured to send 104 the highlight-marker comprising a highlight time and an event identifier to the server system 301. The highlight-marker and the highlight time comprise a time reference of the mobile device time reference system.

The server system 301 is configured, e.g. by means of a specific computer program on the server system 301, to synchronize the time reference of the video file and the time reference of the highlight time to a common time reference. The common time reference, in this case, is the time reference of the server system 301.

Figure 2:
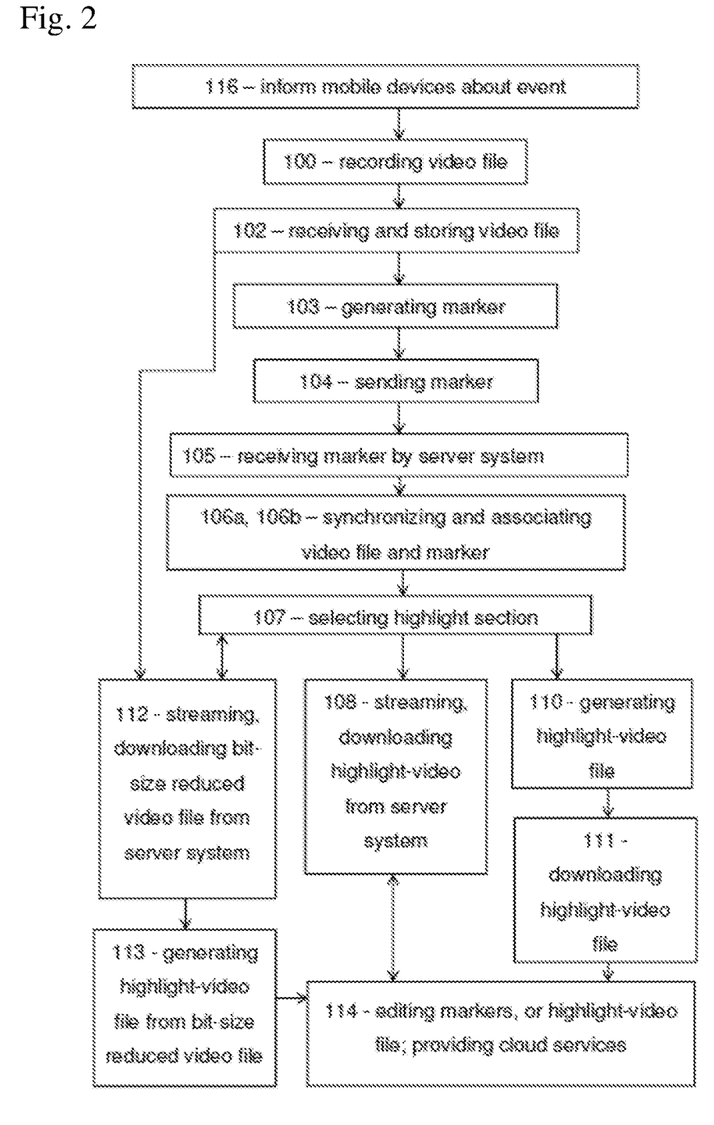
FIG. 2 a flow chart of the method according to the invention.

In FIG. 2 an exemplary embodiment of the method according to the invention is shown. In a first step, mobile device users that are registered with the app for remote tagging of video files, are informed 116 about an event that is about to happen and that is eligible for the remote tagging method according to the invention.

Upon the beginning of the event, a camera 300 starts recording 100 a video file encoding a video of the event. The video file is sent, received and stored 102 on a server system 301.

A user attending the event triggers the generation 103 of a highlight-marker, indicating a section the user wants to have tagged in the video file. Said highlight-marker is sent 104 from the mobile device to the server system, where it is received 105.

On the server system 301, the video file and the highlight-marker are synchronized 106a with respect to the time reference system of the server system 310 so that simultaneous events have the same time code associated in the video file and the highlight time. The time-synchronized video file and highlight-marker are associated 106*b* on the server system 301.

In a subsequent step, a highlight section is selected 107 in the video file based on the highlight time comprised by the highlight-marker.

From there, a highlight-video file can be generated 110 on the server system 301 and provided for download 111 to a computer or the mobile device 303.

Alternatively or simultaneously, the highlight section can be streamed 108 to the mobile device 303 or a computer.

Also, it is possible to stream 112 a video that is optimized for live streaming applications, i.e. a bit-size reduced video file, from the server system 301 to the mobile device 303, particularly in real-time or in close-to-real-time.

The bit-size reduced video stream can be used for tagging 107 of highlight sections on the mobile device 303 rather than on the server system 301. For this, the bit-size reduced video file comprises also a time reference synchronized to the server system 301 (which is easily possible, as the bit-size reduced video file is generated on the server system 301), so that when a user marks a highlight section of the video stream, the highlight-marker time reference can be synchronized to the time reference of the server system 301 on the mobile device 303.

In an optional step, such marked highlight section can be saved 113 on the mobile device 303 instantly or uploaded to the server system 301.

It is also possible to edit 114 the highlight-markers later on the server system 301.

Figure 3:
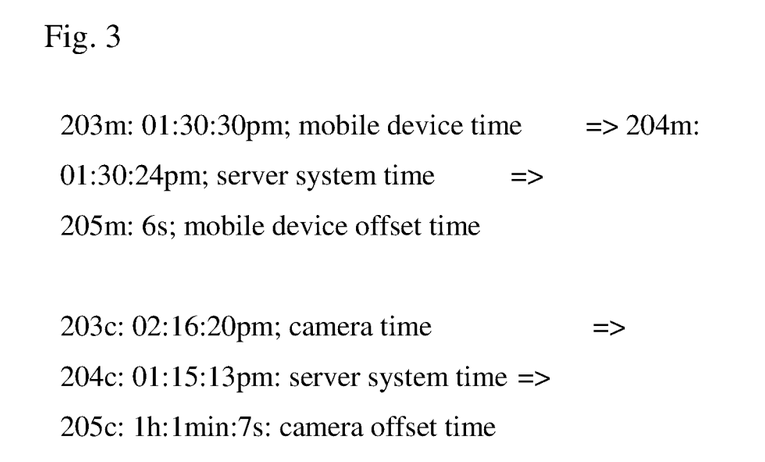
FIG. 3 synchronization of different time reference systems.

In FIG. 3 an example is shown how the synchronization step of the video file and the highlight-marker can be executed.

Initially, when the camera 300 connects to the server system 301, the time reference system of the mobile device 303 (MDT) and the server system 301 (ST) are related to each other so that an offset time between the MDT and the ST can be established.

First, the mobile device sends 203*m* a data package and associates the current time of its time reference system to it. In this example it is 1:30:30 pm MDT.

Upon receipt 204*m* of said data package, the server system 301 compares its time reference to the data package and estimates 205*m* an offset time of 6 s, as the time of sending the data package can be estimated from the server system 301 to be 1:30:36 pm ST. The estimation can be based on the Network Time Protocol (NTP).

The essentially same steps 203*c* to 205*c* are performed with the camera 300. Here, the offset time is estimated 205*c* to be 1 h, 1 min, and 7 s.

Alternatively, as many cameras do not offer to send a synchronization signal to the server system, it is possible that the camera operator sends a synchronization signal from a (e.g. his) mobile device, indicating the time when the camera operator starts the video recording. This synchronization signal can be used to identify the start time of the video—that might be uploaded to the server system at a later time point—in an analogous way as laid out for the highlight-marker synchronization.

In the following, some exemplary embodiments of the invention are described.

End-to-End System:

In the ideal end-to-end embodiment of the current invention, a video camera with a 180 degree viewing and recording angle would be positioned in front of a stage or on a side-line at the midpoint of a field; such as the 50 yard line in a football field or the side-line at the midpoint line of a soccer pitch.

The video camera 300 would be placed on a telescoping tripod, raised above standing height for an average person and tilted down to observe the movement on the field. The video camera would record the activity across a 180 degree area. The video recording device would employ Wi-Fi, Bluetooth, Zig Bee or other wireless local area connection technology. While the camera records high definition video to local storage 302, a processing unit, particularly a server system 301 with wireless connectivity allows spectators, parents, coaches, etc. to interact with the platform. A parent would have installed an app on a mobile device 303, such as their smartphone or tablet to tag a highlight to the platform identifying the approximate time of a highlight they would like to review later. The app would have prominent buttons indicating 1, 2, 3 or other minutes or seconds back for the spectator to estimate the approximate time of the highlight. The local system, particularly a local server 301*a*, records all spectators in the area signed onto the local game via their application or could gather the information via a cloud application. Their application identifier, also referred to as user identifier, is then used to tag the highlights, so that when the spectator logs on to see the video via a website or stream it from the local recording device, particularly the server system 301, they are able to jump directly to the approximate place for replaying the highlight. At the website and on the mobile application, the spectator will also be given the ability to more closely tag the beginning and end of the highlight, as well as convert the highlight to a gif or another small file, also referred to as the highlight-video file, that can be stored and/or sent to friends and family.

In the preferred embodiment of the current invention, the app on the spectator's phone would also have the ability to view the highlight streamed to the phone from the video camera 300. It is envisioned that the local area network connection will be able to support a wireless stream to each spectator's phone by transcoding the high definition recording into a lighter format for wireless transmission to the app on the spectators' smartphones, which can be numerous in the local area of an event. The streaming and transcoding can be for example take place on the server system 301. In this scenario, the spectator will be able to tag the beginning and end of highlights directly in the app on the smartphone, and in near real time download or send the highlight as a link or other light video format to friends and family.

Live Streaming Method, Process & System:

The same method, process, and functionality of the current invention can be enabled via a cloud-based service. Just as people are able to live stream events today, an event being live broadcast can have local spectators that communicate their highlight tags to the cloud service that is streaming and or recording the event. The app on the spectator's smartphone can then receive a lighter image stream to the smartphone which the spectator can use to more clearly mark the beginning and end time to create a downloadable file to keep or send. Additionally, with a cloud service, the spectator could keep the highlight in the cloud and send an URL to it from their smartphone. In the live streaming embodiment of the current invention, the local system will code the live video simultaneously in high definition and a lighter version. The lighter version can be made available to stream highlights to parents or coaches viewing the game, using their local smartphones, tablets, etc. that utilize the mobile app of the current invention. The local wireless network can stream the content as if it were instant replay. The parent or spectator can mark the start and stop of highlights and save the highlight to their device, send the start-stop time-tags to the local system or cloud application for later access from the cloud platform where all videos are downloaded and kept in high definition and other formats for later access.

Device Agnostic Method, Process & System:

In the most basic video recording device agnostic embodiment of the current invention, any video recording device could also be utilized. There are many types of video cameras, including mobile phones, and the ability to tag highlights of interest from any spectator for later viewing, downloading and sharing can be accomplished with whatever video device the user has at hand. In order to enable spectators to tag highlights from an unknown or undisclosed video camera the following procedure can be applied: At the beginning of the match they open the smartphone app of the current invention; in the app they can check to see the current time of the smartphone, then they turn the camera on and assure the current time is correct, within a minute or two, preferably within a few seconds is acceptable.

Then, in the smartphone application they title the game or event, and add any additional metadata they deem necessary, such as location name (since the location coordinates can already be applied by the application reading it from the smartphone's location service), this is particularly referred to as the event identifier. Having created the event identifier, the application will then publicize the event to all smartphones for spectators within a short geographic vicinity. The app on spectators' smartphones can then notify them via an alarm, vibration, etc. and give the spectator the ability to sign on to the event. Once the event is active in the app, the user interface of the app will offer the spectator button to tag highlights and any other features which may come with the service in their local area, such as: streaming highlights if available, ability to edit, download and share from the app, ability to tag a highlight with a specific name, such as a team member or member of a theatrical group, etc. The video operator is now ready to start recording whenever he needs to do so. The operator can make one long recording of the event or multiple short recordings. Once he is finished at the event, he uploads all the recordings to the cloud service, under the same event name. The cloud service of the current invention stitches the video segments together by reading the timestamps of the various files. During the event, the spectators will have tagged their important highlights via the app and the app subsequently loaded those tags to the cloud service. Once the video file is available, the tags are overlaid to the video and when each spectator logs onto the website, they are able to go right to the approximate place they tagged. If the spectator chose the wrong event to associate the highlight tags, no problem, the tags may be re-associated to another event at any time, thus not losing their highlights. At the website of the cloud service of the current invention, they can place more accurate begin and end tags as well as download or share files or URLs with friends and family. No special video recording equipment needs to be purchased with the method, process, and system of the current invention. The approximate date and timestamp for the region back to a universal time does need to be maintained in good synchronization in order for the video content to match the spectator tags more accurately, particularly as most highlights play out in seconds of duration.

The spectator is subsequently able to post the highlight via social media, send via email, create a gif to share or send a link for future access from the cloud platform. Over a season or for a game, the cloud service can offer compilations of a child's highlights for parents to download.

Similarly, the cloud service can systematically produce title images for the highlight sections, by taking a poll of the time durations of spectators who selected a given highlighted time range and use the midpoint or other statistically significant point during the highlight to grab an image and use it to depict the highlight statically, or it to be selected later in an album or via a webpage.

The extensibility of the current invention allows for the tagging service to be made available via an application programming interface (API) to other applications that manage event participation; such as a team event organizing app which may already maintain calendared events, games, and team rosters; as well as event apps that provide an electronic playbill or program for a theatrical or other spectator event. In this way, the tagging can be done with a few buttons exposed in the team organization app that uses the API to pass highlight tags to the cloud service of the current invention; and since the team roster is already available in the team organization app, the spectator can associate highlights with any player of the team without typing a name, but utilizing a drop down menu, or popup button. In a theatrical event, the spectator can tag a time where a musical number is sung or a funny line is delivered by a specific child listed in the playbill app. At a graduation, the spectator can tag the moment a candidate's name is called to receive an award, or when they make a speech, within an application dedicated to the ceremony.

Integration of the method and system of the current invention with applications that have event time, date venue, etc. and participant information captured in some fashion, provides an even more useful user experience as the spectator need not populate metadata that the current invention can utilize from another application, and connect with the live tagged information for the recorded event.

Multi-Platform Method, Process & System:

In a multi-platform embodiment of the current invention, the recording of a video may be done by multiple people using different devices while attending the same event. As an example, two teams often have their own team video recorded for the same event, as well as parents filming via their own recording devices, cameras, phones, etc. Likewise, at an event such as a graduation, parents may each have their own devices to record all or portions of the event; similarly at a speaking event, or concert, theatrical, etc.

For events where multiple points of view may be filmed, or some parents do not record but would like to benefit from the recordings of others, the method, process and system of the current invention allows for an extensible method for event tagging videos and a system for loading and aggregating video across platforms to present highlights that may be captured from different devices, across different perspectives, by different people at the same event.

As an example, there is a high school graduation being recorded by the school. However, there are any number of parents and alums recording with cameras, phones or video devices. The videos may be loaded or streamed to the cloud service of the current invention or may be uploaded to other sites such as video hosting sites, social media sites, blogs, etc. If they are posted using a common event tag designation, in a preferred embodiment we utilize the ">" symbol (similar to hashtag "#", but specifically for video tagging), the ">" symbol resembles the "play" button on recording devices and thus would be a good visual tag for video, but any other symbol, used uniformly, would also work. The videos are loaded to their respective sites or hosting platforms and event tagged with the ">" and the name given to the event, such as: >GarfieldHSGrad2017. Once posted the system of the current invention would index the videos available on its platform, or across other platforms by searching for the common event tag (>GarfieldHSGrad2017). The system would then superimpose the highlight tags, created by the spectators in attendance on their smartphone app of the current invention, onto the multiple videos falling within the same highlight time of interest. The system would then be able to offer multiple views and location perspectives from across the videos it had indexed using the common "play" event tag.

The multi-platform embodiment of the current invention is able to create a community of contribution to the highlights which all spectators can benefit from and use to create montages of the same event from different perspectives. Contributing video for the event is as simple as tagging the common event name, which the method, process and system of the current invention would be able to control for consistency by providing a web service which could issue event names as needed, and assure that events do not duplicate the same name. Otherwise, the global index would deliver bad content to the user.

In a further embodiment of the current invention, the tagging is achieved via voice commands so as to free the spectator from pressing a button. In a loud sporting event, the effectiveness of the voice enablement will vary by the microphones and noise cancellation available in the spectator's personal device. For someone such as a coach, voice enablement can free them up to continuously monitor the game but with a microphone signal a tag, such as by saying: "Tag, good defensive play by Sammy". Through voice recognition, the tag will carry the metadata for the player with full name, and the type of play, in order to make each game searchable for highlights by players, type of play, etc. This will help the coach identify important plays to go back and reference, as well as create highlight reels for players on the team, all while not taking his/her focus from the game.

In the following the components of an exemplary system according to the invention are listed:
- a 180 degree video capture device or any video recording device that can maintain a common regional timestamp, and associate it with the recorded file.
- a stand for video capture device.
- processing, storage and wireless capability in a central unit, could be a tablet, phone or other computing device connected to video capture device via wire or wireless, also referred to the server system.
- application for smartphone, tablet or other portable personal computing device, including wearable devices, such as glasses or wearables with screen interfaces.
- cloud repository, such as a web server 301*b*, to store the content recorded locally which can be uploaded in real time or afterward upon connection to the internet.
- cloud application to allow video editing, video processing, marking and sharing via social media, email or other content sharing platforms.
- highlight tags with an initial user defined range and a regional timestamp, also referred to as highlight-markers.
- event tags defined specifically for a specific event, for example, an event identifier.

In the following, another exemplary embodiment of the invention is disclosed. The example illustrates the preferred embodiment of the current invention utilizing local recording, processing, storing and serving streamed to a cloud service for a spectator's' application to interface with the local service of the current invention or to the cloud provisioned service of the current invention Step 1: Video Recording Device Setup In an ideal embodiment, a video camera will record activity across a 180 degrees area so that following the action is not a manual chore.

Basic information is entered into the system of the current invention, such as location, title of the event, check local time zone as basic information. The information may also be input to a smartphone or web enabled device.

The event name can be broadcast to local applications on mobile devices via a local wireless connection or published to a cloud service that offers geolocation services to broadcast to devices that are hyper local.

Step 2: Spectator Application Setup

Within any mobile environment, either IOS or Android, or web enabled device; a spectator indicates a dynamic timeframe to tag. These time ranges become the initial reference points for snippets of video the user will be able to access later. For instance, a +/−1 min means that when the user hits the tag button, 1 minute before and after will be the time slice they want to highlight (for a total of 2 min). This timeframe is only a reference to the original video and can be re-defined at any time as long as the video and spectator defined tags are maintained in the cloud service.

The spectator is identified by system ID, by phone number, email or other credentials which he uses to set up the mobile application. The spectator can also have specific metadata pre-created for use during events; such as the names of players, the type of plays, goals, assists, passes, defensive tackles, etc. which follows their highlight tag. If the spectator has multiple children in different sports or events that occur regularly, they will be able to set up a group of tags for each type of event (by sport, theatrical, etc.) or by child (son, daughter, etc.) or any other grouping that makes sense to them. The spectator will also be able to use voice commands to create a highlight tag and apply other metadata. At the time of setup, the application will walk the spectator through a voice recording map of his/her pre-defined metadata tags. As the technology to recognize voice advances, the initial setup of voice commands to form recognizable patterns may not be necessary.

Step 3: Event Initiation

At the time of the event, the spectator will be offered a list of event names available in the immediate area (via geolocation identification) or can simply input the name of the event if the event coordinator or other person recording the event provides it. The spectator will then be able to select a new time range for his/her tags or keep an existing default. Likewise, the spectator will be able to identify a pre-created bundle of additional metadata that will automatically pop up once the highlight tag button is pushed. Similarly, voice recognition commands will be loaded if the spectator's device has the necessary capability enabled. Then as the event unfolds the spectator will tag highlights as he/she views them.

Step 4: During Event

During the event, if the end to end or live streaming embodiment of the current invention is utilized, the spectators will have the opportunity to view highlights they have marked via their mobile device. At which point the spectator can move the start and end of the highlight as they like in order to best capture the action they value. They will also be able to capture a snippet via a GIF or other light video format in order to share with others as a file, a post or link.

Step 5: After Event

After the event, and from any web enabled device, the spectator will be able to view and edit his/her highlight tags on the uploaded video. At the web interface to edit the video tags they will also be able to create the snippets to send out as light video files, links or posts to social media. Additionally, they will be able to save specifically tagged highlights to group for compilation as a highlight reel or be able to contract for additional services such as video enhancements, printing of pictures, etc.

The present invention, therefore, relates to a method and a system for remote and real-time selecting a section in a video file with a mobile device, wherein a spectator attending an event selects a section of a video file by sending a highlight-marker from his mobile device to a server system, wherein the selection can be performed without the user having access or connection to the camera recording the event. Highlight-marker and video file are systematically time synchronized by the system and methods of the current invention.

We claim:

1. A method for remote selection of a section in a video file with a mobile device (303), comprising the steps of:
    receiving at a server system (301) from a camera (300) a video file encoding a recording of a video, said video file having a video file time reference provided by the camera (300);
    storing (102) at the server system (301) the video file;
    receiving from a mobile device (303) at the server system (301) an electronic highlight-marker generated (103) based on a user input to the mobile device (303)), wherein the electronic highlight-marker comprises, a highlight time defining a time segment based on a time reference system of the mobile device (303), and an event identifier;
    generating a time-synchronized video file through synchronization of the video file time reference and the highlight time thereby enabling a user providing a user input to select a video section of the video without requiring the user to access an instant playback of the video, said synchronizing provided by;
    generating (107) a highlight section of the time-synchronized video file, wherein the highlight section of the time-synchronized video file is generated according to the highlight marker and the event identifier;
    enabling a device associated with the server system to playback (112, 108) a highlight-video, wherein the highlight-video comprises the highlight section of the time-synchronized video file, wherein the video file and the highlight time are synchronized in time by the steps of:
        determining (205c) a camera offset time between the time reference system of the camera (300) and a server system (301); determining (205m) a mobile device offset time between the time reference system of the mobile device (303) and the server system (301); and offsetting
        offsetting the video file time reference by the camera offset time and the time reference of the highlight time of the highlight-marker by the mobile device offset time such that the time reference of the video file and time reference of the highlight time, are time-synchronized, particularly to the time reference system of the server system (301), wherein the server system particularly provides the common time reference system.

2. The method according to claim 1, wherein the highlight time comprises a start time, an end time and/or a centre time, wherein the highlight section of the video file comprises the part of the video that has been recorded between the start time and the end time or between the start time and a predefined highlight duration length after the start time or between the end time and a predefined highlight duration length before the end time or around a predefined highlight duration length centred around the centre time respectively, wherein particularly the highlight-duration length is particularly 10 seconds, 30 seconds, one minute, or three minutes.

3. The method according to claim 1, wherein the highlight time, particularly the start time or the centre time, comprises or corresponds to a time point that lies in the past by a predefined, particularly user-adjustable time, particularly 10 seconds, 30 seconds, one minute, or three minutes, with respect to the time of the user input on the mobile device (303).

4. The method according to claim 1, wherein a person recording the video file sends a video start-time marker, particularly with a mobile device or the camera, when the person starts to record the video file, such that the video file time reference can be synchronized to the common time reference by means of the video start-time marker, particularly by associating the start time of the video that can be determined from the video file time reference to the video start-time marker, wherein said video start-time marker is synchronized to the common time reference system.

5. The method according to claim 1, wherein the server system (301) comprises a web server (301b), particularly comprising an application server and wherein at least one step of the method is carried out on the web server (301b), wherein the web server (301b) is particularly connected to a local server (310a) arranged at the camera (300).

6. The method according to claim 1, wherein a plurality of highlight-markers, particularly sent from a plurality of mobile devices (303), wherein the highlight times of the plurality of highlight-markers are time-synchronized, and associated to the time-synchronized video file, wherein the plurality of highlight-markers mark a plurality of highlight sections.

7. The method according to claim 1, wherein a title image for displaying with the highlight section is selected, wherein the title image is selected from an overlap section of the plurality of highlight sections that overlap in time, wherein the title image corresponds to a frame of the video file that is comprised in the overlap section, wherein said frame corresponds particularly to the frame in the centre or the frame corresponding to the mode of the overlap section.

8. The method according to claim 1, wherein the highlight-video is played back on a computer or the mobile device (303), wherein, when the highlight-video is played back, the server system (301), particularly the web server (301b) streams only the part of the video file that corresponds to the highlight section of the video to the remote computer or the mobile device (303).

9. The method according to claim 1, wherein the computer or the mobile device pre-fetch and fetch only the section or the sections of the video file from the server system that correspond to the highlight section or to the highlight sections.

10. The method according to claim 1, wherein a highlight-video file comprising the highlight section of the video file is generated and stored on the server system (301), particularly on the web server (301b), particularly wherein a download-, streaming- or sharing-link of the highlight-video is generated and provided to the user of the mobile device (303) or selected recipients.

11. The method according to claim 1, wherein a bit size-reduced video stream is sent to the mobile device, particularly while the video file is being recorded by the camera (300), wherein the bit size-reduced video stream is played back on the mobile device (303), and wherein particularly a highlight-video file is generated from the bit-size reduced video stream and the highlight-marker, particularly wherein the highlight time of the highlight-marker and the bit-size reduced video stream are time-synchronized based on the time reference of the server system (301).

12. The method according to claim 1, wherein a plurality of cameras (300) record a plurality of video files, wherein the event identifier is the same for the video files, and particularly an extended highlight section is selected, wherein said extended highlight section comprises at least one highlight section of the time-synchronized video files comprising the part of the recorded videos that have been recorded simultaneously with the time-synchronized highlight time.

13. The method according to claim 1, wherein an event indicator is sent to mobile devices (303) that are within a predefined vicinity of the camera (300), wherein the event indicator comprises the event identifier, wherein the mobile devices (303) are particularly registered by a common register, wherein said register is particularly a software register associated with a computer program executed on the mobile device (303).

14. The method according to claim 1, wherein a time difference between the time reference of the video file and the common time reference system is stored on the server system (301), wherein the stored time difference is assigned to the camera that recorded the video file, and wherein the stored time difference is used for synchronizing the time reference of the video file and the highlight time of the highlight-marker to the common time reference system of a subsequently recorded video file by the camera (300).

15. The method according to claim 1, wherein a user providing the user input has no access to an instant playback of the video file for selecting a video section.

* * * * *